United States Patent Office 3,215,631
Patented Nov. 2, 1965

3,215,631
LUBRICANTS CONTAINING ASHLESS NITROGEN-CONTAINING POLYMERIC DETERGENTS AND COMPLEXES OF ACID ARYL PHOSPHATES
Bennett M. Henderson, Edwardsville, Ill., and John S. Coon, New York, N.Y., assignors to Shell Oil Company, New York, N.Y., a corporation of Delaware
No Drawing. Filed Feb. 8, 1963, Ser. No. 257,103
16 Claims. (Cl. 252—49.9)

This invention relates to new and improved lubricating oil compositions possessing beneficial multifunctional properties. More particularly the invention relates to highly detergent non-ash forming mineral lubricating oil compositions which are wear resistant and non-corrosive.

It is known that lubricating oils containing certain metallic salts or soaps such as metal sulfonates possess good dispersing and detergent properties. Such lubricants, however, tend to form metallic deposits on engine. Because of this recent trends in this field have been to use of non-ash forming basic and essentially neutral polymeric nitrogen-containing dispersants such as copolymers of polymerizable amines or amides with long-chain acrylate esters of high molecular weight. These non-ash forming nitrogen-containing compounds are excellent detergents but under engine operating conditions they lack stability as well corrosion and wear inhibiting properties. Attempts to improve these polymeric detergent materials either by modification or use of auxiliary additives has met with little success. In most cases the auxiliary additives which are promising stabilizers and wear inhibitors are metal-containing compounds such as metal sulfonates or metal carboxylates and these are to be avoided for reasons stated.

It is an object of the present invention to provide an improved non-ash forming lubricating oil composition. It is another object of the invention to provide an improved detergent lubricant possessing good stability and antiwear properties. Still another object of the invention is to provide a corrosion resistant non-ash containing or forming lubricating oil composition. Other objects will become apparent during the following description of the invention.

It has now been discovered that lubricants containing certain non-ash forming nitrogen-containing polymeric detergents can be rendered non-corrosive and sludge and wear resistant and their stability greatly improved by addition to such lubricating compositions a small amount of a complex of an (X) acid aryl phosphate and (I) a polyhydric alcohol or (II) a polyether alcohol having the formula R-phenyl-(OR')$_n$OR"—OH where R is an alkyl radical of from 4 to 20 carbon atoms, R' and R" are the same or different alkylene groups such as ethylene or propylene groups and $n$ is a number from zero to 8, preferably from 2 to 6. The additives (X) and (I) or (II) are present in proportions of 0.01:1 to 1:1 respectively and the amount by weight of each of these additives can vary from about 0.01% to about 2%. The detergent polymer can be present in amounts of from about 1% to about 10% by weight.

The polymeric detergents, which function synergistically with complexes of additive (X) an acid aryl phosphate and (I) or (II) additives, are derived from nitrogen-containing polymerizable monomers containing primary, secondary or tertiary (the latter two are preferred) amino nitrogen, including heterocyclic amino containing substances, having an ethylenically unsaturated polymerizable group. These detergent polymers may be obtained by polymerizing vinyl substituted heterocyclic amino nitrogen-containing substances such as vinyl pyridines, or polyamines prepared by reducing, in the presence of ammonia or primary or secondary amines, with polymerizable unsaturated alcohols, acids or esters such as acrylates and methacrylates of long-chain fatty acids, and the like. The preferred polymeric amino compounds are those containing tertiary amine groups and particularly those containing heterocyclic amino groups such as obtained by copolymerizing a polymerizable heterocyclic nitrogen base compound with a polymerizable unsaturated material free of heterocyclic nitrogen-containing radicals which can be illustrated by: copolymers of stearyl methacrylate, lauryl methacrylate and 2-methyl-5-vinyl pyridine; and those which contain additional $C_{1-4}$ alkyl methacrylates in the polymer, such as copolymers of stearyl methacrylate, lauryl methacrylate, methyl methacrylate, and 2-methyl-5-vinyl pyridine; and similar copolymers in which the methyl methacrylate is replaced by butyl methacrylate and 2-methyl-5-vinyl pyridine is replaced by 5-ethyl-2-vinyl pyridine. Other suitable polymeric amine detergent copolymers of $C_{8-18}$ alkyl acrylates, e.g. lauryl methacrylate and amino alkyl acrylates, e.g. diethylaminoethylmethacrylate. Also suitable are vinyl pyrrolidone-containing polymer or similar copolymers as described in Belgian Patent 550,442 and British Patent 808,664, and mixtures thereof. Acrylate-vinyl pyrrolidone copolymers are sold by Rohm and Haas under the designations Acryloid 315X or 917 or 966 and are copolymers of N-vinyl pyrrolidone and lauryl methacrylate of varying molecular weights.

Still another class of basic amino nitrogen-containing detergent polymers are polymeric amino-imide-containing detergents such as N-dialkylamino alkyl alkenyl succinimides and illustrated by N-dimethylaminopropyl polybutenyl succinimide, or tetraethylene pentamine derivative of polybutenyl succinic anhydride and the like.

Preferred basic amino detergent polymers are illustrated by the following examples.

EXAMPLE I

A mixture of 25% of 2-methyl-5-vinyl pyridine and 75% stearyl methacrylate were heated in a 50–50 mixture of benzene and light mineral oil (East Texas 100 SSU at 100° F. neutral) to about 120° C. at which time 0.25% wt. of ditert. butyl peroxide was added and the reaction mixture was maintained at this temperature for about 6 hours.

At the completion of the reaction, the solvent was stripped off and the polymer diluted with neutral oil to a polymer content of about 30% by weight and filtered at 100–120° C. The copolymer had a molecular weight of about 200,000 and a nitrogen content of 2.94%.

EXAMPLE II

30% stearyl methacrylate, 51% lauryl methacrylate, 14% methyl methacrylate and 5.0% 2-methyl-5-vinyl pyridine were charged to a 300 gallon stainless steel autoclave. A 50–50 mixture of benzene and neutral petroleum oil was then added to the autoclave so as to furnish 1 part of the mixture per 3 parts of the total monomer. 0.25% of ditert.butyl was then added and the mixture heated at 120° C. for about 7 hours.

At the completion of the reaction, the benzene was stripped off to final conditions of 120° C. and 10 mm. Hg with nitrogen purging. The benzene-free product was then diluted with neutral oil to a polymer content of about 30% by weight and filtered at 100–120° C. The polymer have a molecular weight of about 600,000, a nitrogen content of 0.54% and a pKa value of 4.8.

EXAMPLE III (INTERMEDIATE)

A mixture of 1000 gms. (1 mole) of a polybutene having a molecular weight of about 1000 and 98 mgs. (1 mole) of maleic anhydride was heated at 410° F. in a nitrogen atmosphere with agitation for a period of 24 hours. The reaction mixture was cooled to 150° F. and 700 cc. of hexane added; after which the mixture was filtered under vacuum. After vacuum distillation to remove the hexane from the filtrate, the product was maintained at 350° F. at an absolute pressure of 10 mm. Hg for one hour to remove traces of maleic anhydride. The crude polybutenyl succinic anhydride thus prepared had a saponification number of 79.

EXAMPLE IIIa.—PREPARATION OF TETRAETHYLENEPENTAMINE DERIVATIVE OF THE POLYBUTENYL SUCCINIC ANHYDRIDE OF EXAMPLE III HEREINABOVE

A mixture of 84 gms. (0.45 mole) of tetraethylene pentamine and 702 gms. (0.45 mole) of the polybutenyl succinic anhydride of Example III hereinabove, was blended with agitation at 125° F. in a nitrogen atmosphere. The temperature was increased to 400° F. during a period of one hour, after which the absolute pressure was reduced to about 200 mm. Hg during a period of 30 minutes to facilitate the removal of water. The reaction mixture was then allowed to reach room temperature at this reduced pressure. The reaction product contained 5.1% nitrogen (theory=5.4%). Infra-red analysis showed that the reaction product was imide containing a polybutene side chain.

EXAMPLE IV

A mixture of 21.3 gms. (0.21 mole) of dimethylaminopropylamine and 150 gms. (0.09 mole) of the polybutenyl succinic anhydride of Example II hereinabove, was blended with agitation in a nitrogen atmosphere, and the mixture was heated at 500° F. for a period of one hour, after which the absolute pressure was reduced to about 200 mm. Hg at this temperature during a period of 30 minutes to facilitate the removal of water and excess amine. The reaction mixture was then allowed to reach room temperature at this reduced pressure. The reaction product contained 1.7% nitrogen (theory 1.8%) and pKa value of 9–10. The identity of the N-dimethylaminopropylalkenyl succinimide was established by means of infra-red spectroscopy.

EXAMPLE V

Polyisobutylene succinic anhydride was prepared by reacting a polyisobutylene (M.W. 850) and succinic anhydride at around 400° F. About 500 gms. of polyisobutylene succinic anhydride thus formed was admixed with 50 gms. of diethylenetriamine in toluene at ambient temperature. The amine was added in increments and the temperature controlled so as not to rise above about 120° F. The reaction proceeded for 15 to 30 minutes after which the solvent was removed and the end product, a semi-amide of the above reactants, had a nitrogen-content of 1.6%.

EXAMPLE VI.—TETRAETHYLENE PENTAMINE DIIMIDE OF MONO(POLYISOBUTYLENE)SUCCINIC ACID

Polyisobutylene having a molecular weight of 1185 and bromine number of 21 was heated to 212° F. and an equivalent amount of maleic anhydride was added slowly over a period of about 30 minutes. The reactants were heated to 390° F. to 400° F. and maintained at this temperature for 16 hours. On cooling, mono(polyisobutylene)succinic anhydride was recovered by dissolving in 1.5 liters of petroleum spirit (60–80° C. B.P.) and recovering the product by filtering. About 2 moles of this product was admixed with one mole of tetraethylene pentamine and added to a petroleum spirit solution. The petroleum spirit was distilled off and replaced by 1 liter of toluene which was also distilled off to aqueotropically remove water, and the residue was heated to 390° F. to 400° F. and maintained at this temperature for three hours. The recovered product, tetraethylenetriamine diimide of mono(polyisobutylene)succinic acid.

Other representative copolymers useful in lubricating compositions of this invention include those identified below in which the monomeric units are present in the mol ratios of 1:1, 1:2, 1:4, 1:6, 1:8, 1:10 and 1:20, of the monomer containing the oleophilic unit to the amino nitrogen-containing polymerizable material, respectively, said copolymers having a molecular weight in excess of 50,000 and over 50,000: lauryl methacrylate/styrene/2-methyl-2-vinylpyridine, lauryl methacrylate/styrene/2-methyl - 5 - octyl methacrylate/N-vinyl-3-methyl pyrrolidone/cetyl methacrylate, N-vinyl pyrrolidone/stearyl methacrylate, N-vinyl pyrrolidone/stearyl acrylate, N-vinyl - 3,3 - dimethyl pyrrolidone/laurylmethacrylate, N-vinyl pyrrolidone stearyl methacrylate/cetyl methacrylate, N-vinyl-3-methyl pyrrolidone/stearyl methacrylate/lauryl methacrylate and mixtures thereof. The molecular weights of the polymer was detergented by the light scattering method.

The acid aryl phosphate used as one of the complexing components may be represented by the formula:

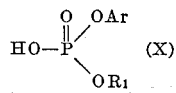

where Ar is an aromatic group and $R_1$ is hydrogen or the same as Ar, the Ar group may be mono or polynuclear having $C_{1-18}$ alkyl radicals attached thereto.

The acid aryl phosphates (X) which are preferred are represented by the formulas:

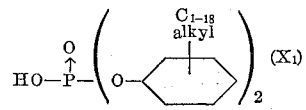

or

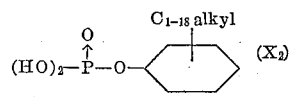

or mixtures of $X_1$ and $X_2$.

The acid aryl phosphates presented by the above-formulas include the mono acid aryl phosphates and diacid aryl phosphates and mixtures thereof. Thus, the compounds of this class may be specifically illustrated by $C_{1-10}$ alkyl phenyl, e.g. methyl, ethyl, butyl, dimethyl, diisopropylphenyl monoacid and diacid phosphates of which preferred are monocresyl and dicresyl acid phosphates and 50:50 mixtures thereof.

The other complexing component are the alcohols as defined by (I) and (II) above. The polyhydric alcohols (I) are the aliphatic polyhydroxy compounds such as glycerol, sorbitol, erythritol, pentaerythritol and particularly oil-soluble high molecular weight polyalcholic polymer compound containing essentially a plurality of recurring $C_8$–$C_{40}$ alkyl-1,2-ethylene and hydroxy-1,2-ethylene units joined together in a chain-like manner through the 1,2-ethylene portions of the monomers, the ratio of the non-acidic oxygen containing units to the alkyl units varying from 1/1 to 1/5 and the average molecular weight of the final product being from about 4000 to about 50,000.

The polyhydric polymeric compounds of this type can be prepared by hydrolyzing a copolymer of a long chain alpha-olefinic hydrocarbon (normal or branched-chain) containing at least 10 carbon atoms with a vinyl ester of a lower fatty acid having up to 5 carbon atoms, such as vinyl acetate, vinyl propionate, vinyl isobutyrate or vinyl isovalerate.

The final product is a macromolecular substance containing essentially a plurality of recurring alkyl-1,2-ethylene and hydroxy-1,2-methylene units joined together in chain-like manner, wherein the alkyl radicals contain at least 8 carbon atoms; and there may be a minor proportion of alkanoyloxy-1,2-ethylene units as essentially the only other polar containing group. The ratio of the non-acidic -oxygen-containing units (hydroxy- and alkanolyloxy-) 1,2-ethylene to the alkyl-1,2-ethylene units is from about 1 to about 5 and the average molecular weight of the final product is from about 4000 to about 50,000. The non-acidic oxygen-containing polar groups present in the final product are predominantly hydroxyl, being at least 80% hydroxyl, preferably at least 90% or as high as 99% of the non-acidic oxygen-containing polar mixture.

The alpha-olefins suitable to form the copolymers include monomers having a single terminal ethylenic group and containing from 10 to 40 carbon atoms and preferably from 12 to 30 carbon atoms, such as alpha-decene, alpha-hexadecene, alpha-tetradecene, alpha-pentadecene, alpha-phetadecene, alpha-octadecene, alpha-nonadecene, alpha-eicosene, alpha-docosene, alpha-tetricontene, and mixtures thereof. Mixtures of alpha-olefins containing from 12 to 20, and preferably 16 to 18 carbon atoms obtained by pyrolysis of paraffin waxes, are particularly suitable and represent a readily available economic material.

and sodium methylate so as to effect a 95% conversion of the acetate groups to hydroxyl groups. This accomplished by adding 10 parts of methanol, 35 parts of isopropyl alcohol and 1 part of sodium methylate per 50 parts of the copolymer and neutralizing with stirring for 8 hours at 70° C. Sodium acetate was then removed by washing twice with 1 part of a 33% isopropyl alcohol-water mixture. After settling, the lower layer was drained off and all low boiling components stripped off at a temperature of 110° C. at 90 mm. Hg. The resulting copolymer was a sticky yellow solid. Analysis:

Mole ratio of acetate plus alcohol groups to olefin
  $C_{14}$–$C_{16}$ alkyl groups _____ 5/1
Mole wt. _____ 2700
Mole ratio of hydroxyl to acetate groups _____ 19/1

Following essentially the procedure of Example IA, other products were prepared as Examples IIA through XXIA in accordance with the following tabulation, showing the polymerization catalyst, polymerization temperature, ratio of vinyl ester to olefin used and ratio in the product, degree of hydrolysis of the ester groups and average molecular weight.

| Example | Catalyst | Temperature, °C. | Vinyl Acetate/Alpha-Olefin Ratio in Monomer | Vinyl Acetate/Alpha-Olefin Ratio in Polymer | Degree of Hydrolysis | Mol Wt.[1] |
| --- | --- | --- | --- | --- | --- | --- |
| II | Ditertiarybutyl-peroxide | 115 | 2.5/1 ($C_{16}$–$C_{18}$ Olefin) | 5 | 92 | 27,000 |
| III | ----do---- | 115 | 1.9/1 ($C_{16}$–$C_{18}$ Olefin) | 2.6 | 95 | 11,000 |
| IV | ----do---- | 115 | 1/1 ($C_{16}$–$C_{18}$ Olefin) | 2 | 95 | 8,000 |
| V | ----do---- | 130 | 2.5/1 ($C_{16}$–$C_{18}$ Olefin) | 4.9 | 92 | 20,000 |
| VI | ----do---- | 140 | ----do---- | 5 | 95 | 20,000 |
| VII | ----do---- | 140 | 4.0/1 ($C_{16}$–$C_{18}$ Olefin) | 4.9 | 90 | 30,000 |
| VIII | Benzoyl peroxide | 80 | 1.6/1 (octadecene) | 3.6 | 95 | 16,500 |
| IX | ----do---- | 80 | 2/1 (octadecene) | 4.06 | 97 | 20,000 |
| X | ----do---- | 110 | ----do---- | 3.4 | 88 | 8,330 |
| XI | ----do---- | 80 | ----do---- | 1.52 | 95 | 5,120 |
| XII | ----do---- | 80 | ----do---- | 1.72 | 95 | 5,710 |
| XIII | ----do---- | 80 | 2.5/1 (octadecene) | 4.1 | 95 | 20,100 |
| XIV | ----do---- | 80 | 2/1 (octadecene) | 3.89 | 97 | 14,200 |
| XV | ----do---- | 115 | 2/1 (octadecene) | 4.1 | 90 | 11,000 |
| XVI | ----do---- | 80 | 2/1 (dodecene) | 2.6 | 90 | 8,000 |
| XVII | ----do---- | 80 | 2/1 (hexadecene) | 3.1 | 90 | 8,000 |
| XVIII | Dichlorobenzoyl peroxide | 60 | ----do---- | 2.14 | 90 | 16,400 |
| XIX | Benzoyl peroxide | 80 | 2/1 (vinylbutyrate/alpha-octadecene) | 2.1 | 90 | 8,000 |
| XX | ----do---- | 80 | 1/1.2 (octadecene) | 1 | 95 | 8,000 |
| XXI | ----do---- | 80 | 1/1.2 (hexadecene) | 1 | 95 | 8,000 |

[1] Mole wt. determined by light scattering technique described in Chem. Res., vol. 40, page 139 (1948).

Normally, these reactants are copolymerized in the presence of a catalyst. Catalysts which are suitable for these copolymerizations include various organic peroxides, such as aliphatic, aromatic, heterocyclic, and alicyclic peroxides such as diethyl peroxide, tertiary butyl hydroperoxide, dibenzoyl peroxide, dimethylthienyl peroxide dicyclohexyl peroxide, dilauroyl peroxide, ditert. butyl peroxide, and urea peroxide. These specific peroxides are mentioned by way of nonlimiting examples of suitable organic peroxides.

The identity and proportion of catalyst selected and the temperature employed in the copolymerization can be varied to produce products having different molecular weights as desired.

The following examples are given as illustrative of suitable products and their preparation:

EXAMPLE IA 2.5 moles of vinyl acetate and 1 mole of a mixture of $C_{16}$–$C_{18}$ alpha-olefins, predominantly $C_{18}$ olefin, and 1% ditertiary butyl peroxide were placed in a stainless steel bomb and the air replaced with nitrogen. The bomb was heated to 115° C. until there was about 90% conversion. The product was topped at 185° C. at 1 mm. Hg pressure.

The polymer product was then mixed with methanol and sodium methylate so as to effect a 95% conversion The polyether alcohols (II) are oil-soluble compounds of the formula R-phenyl-$(OR')_n OR''$—OH where R,R',R'' and $n$ are as defined above. Compounds of this class include oil-soluble ($C_4$–$C_{18}$ alkyl phenoxyl poly-(alkoxy)$_{2-6}$ alkanol wherein the alkoxy group can be —$C_2H_4O$— or —$C_3H_6O$— groups such as octyl phenoxy (ethoxy)$_4$ ethanol, butyl phenoxy (ethoxy)$_2$ ethanol, diisobutyl phenoxy (ethoxy)$_4$ ethanol, dodecyl phenoxy (ethoxy)$_4$ ethanol, butyl phenoxy (propoxy)$_2$ propanol, butyl phenoxy (ethoxy)$_4$ propanol, etc.

Complexes of this invention are obtained by mixing the acid phosphate (X) and the alcoholic compound of (I) or (II) at room temperature and up to about 120° F. for a period of 2–10 hours, in an inert solvent such as isooctane, benzene, xylene if desired, until a homogeneous mass forms. The solvent can be removed by suitable means such as by distillation or allowed to remain. Thus, an illustrative example (A) is obtained by mixing 0.1% wt. of dicresyl phosphate and 0.25% of pentaerythritol at room temperature for 2–4 hours until a homogeneous mass formed. Other complexes include: (B) complex of 0.04% dicresyl phosphate, 0.5% diisobutyl phenoxy (ethoxy)$_4$ ethanol, (C) complex of 0.1% dicresyl phosphate, 0.1% nonyl phenoxy ethanol, (D) complex of 0.04% dicresyl phosphate, 1.2% additive Ex. IA, (E) complex of 0.01% monocresyl phosphate, 0.1% pentaerythritol.

When desired, additional improvements with respect to oxidation stability and scuffing inhibition can be imparted to the oil compositions containing the polymer salts of this invention by incorporating small amounts (0.01%–2%, preferably 0.1%–1%) of phenolic antioxidants such as alkylphenols, e.g. 2,6-ditert.butyl-4-methylphenol or p,p'-methylene bisphenols such as 4,4'-methylene bis-(2,6-ditert.butyl phenol) or arylamines such as phenyl-alpha-naphthylamine; dialkyl sulfides and mixtures thereof, e.g. dibenzyl disulfide, didodecyl sulfide. Antiscuffing agents include full organic phosphites, phosphates, phosphonates and their thio-derivatives, such as $C_{3-18}$ trialkyl phosphites, or phosphonates, e.g., tributyl, trioctyl, trilauryl, tristearyl, tricyclohexyl, tribenzyl, tricresyl, triphenyl phosphites or phosphates, as well as their thio-derivatives, $P_2S_5$-terpene reaction product, phosphonates such as dibutyl methanephosphate, dibutyl trichloromethanephosphonate, dibutyl monochloromethanephosphonate, dibutyl chlorobenzenephosphonate, and the like. The full esters of pentavalent phosphorus acids such as triphenyl tricresyl, trilauryl and tristearyl orthophosphates or potassium salt of $P_2S_5$-terpene reaction product are preferred.

The mineral lubricating oils used in compositions of this invention can be obtained from any paraffinic, naphthenic, asphaltic or mixed base crude, and/or mixtures thereof. The viscosity of these oils may vary over a wide range, such as from 100 SUS at 100° F. to 100 SUS at 210° F. The hydrocarbon oils may be blended with fixed oils such as castor oil, lard oil and the like and/or with synthetic lubricants such as polymerized olefins, copolymers of alkylene glycols and the alkylene oxides, silicone polymers, e.g. dimethyl silicone polymers and the like.

Mineral lubricating oils which are particularly desirable for use in compositions of the invention can be obtained from West Texas Ellenburger crudes, East Texas crudes, Oklahoma crudes, California crudes. A useful solvent refined East Texas mineral lubricating oil had the following properties:

| | |
|---|---|
| Pour point, ° F. | +10 |
| Viscosity, centistokes at 100 ° F. | 27 |
| Viscosity index | 95 |

Illustrative compositions of the present invention are as follows:

*Composition A*

| | Percent wt. |
|---|---|
| Copolymer Ex. II | 5 |
| Ex. A complex | 0.35 |
| Mineral lubricating oil | Balance |

*Composition B*

| | |
|---|---|
| Copolymer Ex. II | 5 |
| Ex. B complex | 0.54 |
| Mineral lubricating oil | Balance |

*Composition C*

| | |
|---|---|
| Copolymer Ex. II | 5 |
| Ex. D complex | 1.24 |
| Mineral lubricating oil | Balance |

*Composition D*

| | |
|---|---|
| Copolymer N-vinyl pyrrolidone/lauryl methacrylate (M.W. 350,000) | 5.5 |
| Ex. B complex | 0.54 |
| Mineral lubricating oil | Balance |

*Composition E*

| | |
|---|---|
| Copolymer Ex. II | 5 |
| Ex. A complex | 0.35 |
| 1,1-bis(3,5-ditert.butyl-4-hydroxyphenyl) methane | 0.5 |
| Tricresyl phosphate | 0.8 |
| Mineral lubricating oil | Balance |

Composition of the present invention were tested for their effectiveness as rust inhibitors in the 18-hour Cadillac Engine Rust Test in which a 1957 Cadillac is operated under the following conditions:

CADILLAC RUST TEST

| Fuel: | | |
|---|---|---|
| TEL, ml./gal | 3.0 | |
| S, percent w | 0.16 | |
| Engine | 1955 Cadillac | |
| Carb Air Humidity, Grains $H_2O$/lb Air | 150±10 | |
| Cycle Portion | I | II |
| Event | Run | Down |
| Duration, Hr | 3 | 3 |
| Speed, r.p.m | 1,300–1,500 | 0 |
| Jacket Out Temp., ° F | 108±2 | 70 |
| Oil Temp., ° F | 130±2 | 70 |
| Blowby, cu. ft./hr | 30±5 | 0 |
| Duration of Test, Hr | 18 | |
| Parts Rated for Rust | Hydraulic Valve Lifters | | and the results are shown in Table I.

TABLE I

| Composition: | Lifter rust rating (10=perfect) |
|---|---|
| Composition A | 8.8 |
| Composition B | 8.3 |
| Composition C | 7.9 |
| Composition E | 8.8 |
| (1) Mineral lubricating oil+5% copolymer Ex. II +0.04% dicresyl phosphate | 5.4 |
| (2) Mineral lubricating oil+5% copolymer Ex. II | 5.4 |
| (3) Mineral lubricating oil+0.5% diisobutyl phenoxy (ethoxy)$_4$ ethanol | 4.8 |
| (4) Mineral lubricating oil | 5.2 |

Lubricating compositions of the present invention can be used in automotive, truck, aeroplane, caterpillar and diesel engines as well as various industrial equipment.

We claim as our invention:

1. A lubricating oil composition comprising a major amount of lubricating oil and from about 1% to about 10% of an oil-soluble nitrogen-containing polymeric detergent selected from the group consisting of (1) copolymer of C-vinyl pyridine and a mixture of dissimilar $C_{12-18}$ alkyl acrylates, (2) copolymer of N-vinyl pyrrolidone and $C_{12-18}$ alkyl acrylate, the mol ratio of the nitrogen-containing compound to the acrylate being between 1:1 and 1:20, respectively, and (3) N-dialkylaminoalkyl alkenyl succinimide and from about 0.1% to about 2% of an oil-soluble complex of an acid diaryl phosphate and an alcohol selected from the group consisting of an nonpolar substituted aliphatic polyhydric alcohol and an alkyl phenoxy alkoxy alkanol having the formula R-phenyl-(OR')$_n$—OR"—OH where R is a $C_{4-20}$ alkyl radical, R' and R" are alkylene radicals selected from the group consisting of ethylene and propylene groups and mixtures thereof, and n is a number from zero to 8 obtained by reacting the acid phosphate and alochol in proportions of 0.01:1 to 1:1, respectively, at between room temperature and 120° F. for from 2 to 10 hours.

2. A lubricating oil composition comprising a major amount of lubricating oil and from about 1% to about 10% of an oil-soluble copolymer of C-vinyl pyridine and a mixture of dissimilar $C_{12-18}$ alkyl acrylates, the mole ratio of nitrogen-containing polymerizable compound to ester being between 1:1 and 1:20, respectively, and from about 0.1% to about 2% of an oil-soluble complex of an acid diaryl phosphate and an alcohol selected from the group consisting of a non-polar substituted aliphatic polyhydric alcohol and an alkyl phenoxy alkoxy alkanol having the formula R-phenyl-(OR')$_n$—OR"—OH where R is a $C_{4-20}$ alkyl radical, R' and R" are alkylene radicals selected from the group consisting of ethylene and propylene groups and mixtures thereof, and n is a number from zero to 8 obtained by reacting the acid phosphate and alcohol in proportions of 0.01:1 to 1:1, respectively, at between room temperature and 120° F. for from 2 to 10 hours.

3. A lubricating oil composition comprising a major amount of lubricating oil and a minor amount of each of an oil-soluble co-polymer of N-vinyl pyrrolidone and a $C_{12-18}$ alkyl acrylate, the mole ratio of nitrogen-containing polymerizable compound to ester being between 1:1 and 1:20, respectively, and an oil-soluble complex of an acid diaryl phosphate and an alcohol selected from the group consisting of a non-polar substituted aliphatic polyhydric alcohol and an alkyl phenoxy alkoxy alkanol having the formula R-phenyl-$(OR')_n$—OR″—OH where R is a $C_{4-20}$ alkyl radical, R′ and R″ are alkylene radicals selected from the group consisting of ethylene and propylene groups and mixtures thereof, and $n$ is a number from zero to 8 obtained by reacting the acid phosphate and alcohol in proportions of 0.01:1 to 1:1, respectively, at between room temperature and 120° F. for from 2 to 10 hours.

4. A lubricating oil composition comprising a major amount of mineral lubricating oil and from about 1% to about 10% of an oil-soluble copolymer of 2-methyl-5-vinyl pyridine and a mixture of lauryl and stearyl methacrylates, the mole ratio of nitrogen-containing polymerizable compound to ester being between 1:1 and 1:20, respectively, and from about 0.01% to about 2% of a complex of diaryl acid phosphate and $C_{4-20}$ alkyl phenoxy polyethoxy ethanol obtained by reacting the acid phosphate and the substituted ethanol in proportions of 0.01:1 to 1:1, respectively at between room temperature and 120° F., in the presence of an inert hydrocarbon solvent for from 2 to 10 hours.

5. A lubricating oil composition comprising a major amount of mineral lubricating oil and from about 1% to about 10% of an oil-soluble copolymer of 2-methyl-5-vinyl pyridine and a mixture of lauryl and stearyl methacrylates, the mole ratio of nitrogen-containing polymerizable compound to ester being between 1:1 and 1:20, respectively, and from about 0.01% to about 2% of a complex of dicresyl acid phosphate and $C_{4-20}$ alkyl phenoxy polyethoxy ethanol obtained by reacting the acid phosphate and the substituted ethanol in proportions of 0.01:1 to 1:1, respectively at between room temperature and 120° F., in the presence of an inert hydrocarbon solvent for from 2 to 10 hours.

6. A lubricating oil composition comprising a major amount of mineral lubricating oil and from about 1% to about 10% of an oil-soluble copolymer of N-vinyl pyrrolidone and lauryl methacrylate, the mole ratio of nitrogen-containing polymerizable compound to ester being between 1:1 and 1:20, respectively, and from about 0.01% to about 2% of a complex of dicresyl acid phosphate and $C_{4-20}$ alkyl phenoxy polyethoxy ethanol obtained by reacting the acid phosphate and the substituted ethanol in proportions of 0.01:1 to 1:1, respectively at between room temperature and 120° F., in the presence of an inert hydrocarbon solvent for from 2 to 10 hours.

7. A lubricating oil composition comprising a major amount of mineral lubricating oil and from about 1% to about 10% of an oil-soluble copolymer of 2-methyl-5-vinyl pyridine and a mixture of lauryl and stearyl methacrylates, the mole ratio of nitrogen-containing polymerizable compound to ester being between 1:1 and 1:20, respectively, and from about 0.01% to about 2% of a complex of dicresyl acid phosphate and diisobutyl phenoxy tetraethoxy ethanol obtained by reacting the acid phosphate and the substituted ethanol in proportions of 0.01:1 to 1:1, respectively at between room temperature and 120° F., in the presence of an inert hydrocarbon solvent for from 2 to 10 hours.

8. A lubricating oil composition comprising a major amount of mineral lubricating oil and from about 1% to about 10% of an oil soluble copolymer of 2-methyl-5-vinyl pyridine and a mixture of lauryl and stearyl methacrylates, the mole ratio of nitrogen-containing polymerizable compound to ester being between 1:1 and 1:20, respectively, and from about 0.01% to about 2% of a complex of diaryl acid phosphate and hydrolyzed copolymer of $C_{12-30}$ α-hydrocarbon olefin and a vinyl ester of a saturated fatty acid of up ot 5 carbon atoms obtained by reacting the acid phosphate and the hydrolyzed copolymer in proportions of 0.01:1 to 1:1, respectively, at between room temperature and 120° F., in the presence of an inert hydrocarbon solvent for from 2 to 10 hours.

9. A lubricating oil composition comprising a major amount of mineral lubricating oil and from about 1% to about 10% of an oil-soluble copolymer of 2-methyl-5-vinyl pyridine and a mixture of lauryl and stearyl methacrylates, the mole ratio of nitrogen-containing polymerizable compound to ester being between 1:1 and 1:20, respectively, and from about 0.01% to about 2% of a complex of diaryl acid phosphate and hydrolyzed copolymer of alpha-octadecene and vinyl acetate having a molecular weight of from 4000 to 50,000 obtained by reacting the acid phosphate and the hydrolyzed copolymer in proportions of 0.01:1 to 1:1, respectively, at between room temperature and 120° F., in the presence of an inert hydrocarbon solvent for from 2 to 10 hours.

10. A lubricating composition comprising a major amount of mineral lubricating oil and from about 1% to about 10% of an oil-soluble copolymer of 2-methyl-5-vinyl pyridine and a mixture of lauryl and stearyl methacrylates, the mole ratio of nitrogen-containing polymerizable compound to ester being between 1:1 and 1:20, respectively, and from about 0.01% to about 2% of a complex of dicresyl phosphate and the hydrolyzed copolymer of alpha-octadecene and vinyl acetate having a molecular weight of from 4000 to 50,000 obtained by reacting the acid phosphate and the hydrolyzed copolymer in proportions of 0.01:1 to 1:1, respectively, at between room temperature and 120° F., in the presence of an inert hydrocarbon solvent for from 2 to 10 hours.

11. A lubricating oil composition comprising a major amount of mineral lubricating oil and from about 1% to about 10% of an oil-soluble copolymer of 2-methyl-5-vinyl pyridine and a mixture of lauryl and stearyl methacrylates, the mol ratio of 2-methyl-5-vinyl pyridine to the ester mixture being between 1:1 and 1:20, respectively, and from about 0.01% to about 2% of a complex of dicresyl acid phosphate and pentaerythritol obtained by reacting the dicresyl acid phosphate and pentaerythritol in proportions of 0.01:1 to 1:1, respectively, at between room temperature and 120° F. in the presence of an inert hydrocarbon solvent for from 2 to 10 hours.

12. A lubricating oil composition comprising a major amount of mineral lubricating oil and about 5% of an oil-soluble copolymer of 2-methyl-5-vinyl pyridine and a mixture of lauryl and stearyl methacrylates, the mol ratio of 2-methyl-5-vinyl pyridine to the ester mixture being between 1:1 and 1:20, respectively, and about 0.35% of a complex of dicresyl acid phosphate and pentaerythritol obtained by reacting the dicresyl acid phosphate and pentaerythritol in proportions of 0.01:1 to 1:1, respectively, at between room temperature and 120° F. in the presence of an inert hydrocarbon solvent for from 2 to 10 hours.

13. A lubricating oil composition comprising a major amount of mineral lubricating oil and about 5% of an oil-soluble copolymer of 2-methyl-5-vinyl pyridine and a mixture of lauryl and stearyl methacrylates, the mol ratio of 2-methyl-5-vinyl pyridine to the ester mixture being between 1:1 and 1:20, respectively, and about 0.54% of a complex of dicresyl acid phosphate and diisobutylphenoxytetraethoxy ethanol in proportions of 0.01:1 to 1:1, respectively, at between room temperature and 120° F. in the presence of an inert hydrocarbon solvent for from 2 to 10 hours.

14. A lubricating oil composition comprising a major amount of mineral lubricating oil and about 5% of an oil-soluble copolymer of 2-methyl-5-vinyl pyridine and a mixture of lauryl and stearyl methacrylates, the mol ratio of 2-methyl-5-vinyl pyridine to the ester mixture being between 1:1 and 1:20, respectively, and about 1.24% of a complex of dicresyl acid phosphate and the hydrolyzed copolymer of alpha-octadecene and vinyl acetate having a molecular weight of from 4000 to 50,000 and obtained by reacting the dicresyl acid phosphate and hydrolyzed copolymer in proportions of 0.01:1 to 1:1, respectively, at between room temperature and 120° F., in the presence of an inert hydrocarbon solvent for from 2 to 10 hours.

15. A lubricating oil composition comprising a major amount of mineral lubricating oil and about 5.5% of an oil-soluble copolymer of N-vinyl pyrrolidone and lauryl methacrylate, the mol ratio of N-vinyl pyrrolidone to the ester being between 1:1 and 1:20, respectively, and about 0.54% of a complex of dicresyl acid phosphate and di-isobutylphenoxytetraethoxy ethanol in proportions of 0.01:1 to 1:1, respectively, at between room temperature and 120° F. in the presence of an inert hydrocarbon solvent for from 2 to 10 hours.

16. The composition of claim 12 containing about 0.5% 1,1-bis(3,5-ditertiarybutyl-4-hydroxyphenyl)methane and about 0.8% tricresylphosphate.

References Cited by the Examiner
UNITED STATES PATENTS

| | | | |
|---|---|---|---|
| 2,285,853 | 6/43 | Downing et al. | 252—49.8 |
| 2,807,653 | 9/57 | Filbey et al. | 252—52 X |
| 2,957,854 | 10/60 | Lorensen et al. | 252—51.5 |
| 3,010,903 | 11/61 | Clarke et al. | 252—49.9 |
| 3,018,250 | 1/62 | Anderson et al. | 252—51.5 |

FOREIGN PATENTS

| | | |
|---|---|---|
| 668,542 | 3/52 | Great Britain. |
| 822,620 | 10/59 | Great Britain. |

DANIEL E. WYMAN, *Primary Examiner.*